United States Patent [19]
Martin et al.

[11] Patent Number: 5,643,448
[45] Date of Patent: Jul. 1, 1997

[54] SPIN-ON FILTER ASSEMBLY INCORPORATING A RE-USABLE TUBULAR FILTER SCREEN

[75] Inventors: Henry Woods Martin, Houston, Tex.; Ian M. Cox, Tintinhull, England; Scott A. Rodibaugh, Houston, Tex.

[73] Assignee: Glacier Metal Company Limited, Northwood Hills, England

[21] Appl. No.: 515,715

[22] Filed: Aug. 16, 1995

Related U.S. Application Data

[63] Continuation-in-part of Ser. No. 311,936, Sep. 26, 1994, abandoned.

[51] Int. Cl.$^6$ ................................................. B01D 35/02
[52] U.S. Cl. ......................... 210/232; 210/443; 210/454; 210/499; 210/DIG. 17
[58] Field of Search .................................. 210/168, 232, 210/435, 440, 443, 444, 453, 454, 499, DIG. 17

[56] References Cited

U.S. PATENT DOCUMENTS

| | | | |
|---|---|---|---|
| 2,031,589 | 2/1936 | Burckhalter et al. | 210/499 |
| 2,097,828 | 11/1937 | Baldwin | 210/453 |
| 2,471,069 | 5/1949 | Le Clair | 210/164 |
| 3,260,367 | 7/1966 | Hultgren | 210/130 |
| 3,502,221 | 3/1970 | Butterfield | 210/444 |
| 3,640,390 | 2/1972 | Goy et al. | 210/443 |
| 4,052,307 | 10/1977 | Humbert, Jr. | 210/130 |
| 4,992,166 | 2/1991 | Lowsky et al. | 210/130 |
| 4,997,556 | 3/1991 | Yano et al. | 210/168 |
| 5,066,391 | 11/1991 | Faria | 210/168 |
| 5,080,787 | 1/1992 | Brown et al. | 210/232 |
| 5,230,795 | 7/1993 | Yang | 210/236 |
| 5,336,406 | 8/1994 | Stanford et al. | 210/235 |
| 5,342,519 | 8/1994 | Friedmann et al. | 210/232 |

FOREIGN PATENT DOCUMENTS

| | | | |
|---|---|---|---|
| 346692 | 12/1989 | European Pat. Off. . | |
| 1174057A | 8/1985 | U.S.S.R. . | |
| 1643051 | 4/1991 | U.S.S.R. | 210/440 |
| 982548 | 2/1965 | United Kingdom . | |

OTHER PUBLICATIONS

"Tattle Tale" Liquid Filtration System, LFS Model 90, from Parker Hannifin Corporation, Racor Division, 4 page brochure (undated).
System 1 Filter System, 2 page brochure (undated).

*Primary Examiner*—Matthew O. Savage
*Attorney, Agent, or Firm*—Synnestvedt & Lechner

[57] ABSTRACT

A fluid filter cartridge is disclosed herein. The filter cartridge includes a generally tubular casing closed at one end and having at the opposite, open end, an annular member defining a filter element receiving aperture and provided with a single seal extending circumferentially of the casing and projecting axially away from the casing. The filter element includes a base ring and a generally tubular filter screen extending from the base ring to an end closure therefor. The base ring and tubular filter screen are dimensioned to fit within the filter receiving aperture. A removable connection is provided between the annular member and the base ring whereby the filter element is removably retained in the casing after rotation of the filter element about its axis relative to the axis of the casing.

8 Claims, 2 Drawing Sheets

SPIN-ON FILTER ASSEMBLY INCORPORATING A RE-USABLE TUBULAR FILTER SCREEN

RELATED APPLICATION

This application is a continuation-in-part of U.S. Ser. No. 08/311,936, filed Sep. 26, 1994, now abandoned.

FIELD OF THE INVENTION

This invention relates to fluid filtration and in particular to a reusable spin-on fluid filter cartridge including a demountable filter element.

BACKGROUND OF THE INVENTION

Traditional fluid filter cartridges for fluids such as engine oil have been almost entirely of the disposable kind in which a pleated paper filter element is employed. Such filter cartridges are generally used in a full and partial flow modes, all or part of the engine oil being passed through the filter of the filter element prior to re-circulation through the engine bearings and other moving parts requiring lubrication. Inevitably, the filter becomes progressively occluded by debris from the engine and from the combustion process. Equally inevitably, the filter cartridge must be replaced periodically and to facilitate this, the well-known spin-on, spin-off construction is now widely used. The used filter cartridge is simply thrown away and replaced by a new one at each oil change. However, such disposal creates environmental problems due to the difficulty of removing oil from the spent filter cartridge. To minimize environmental problems either a reusable filter cartridge with a cleanable filter element, or a much longer period between oil changes, or both, would be desirable.

It has been proposed that oil changes should be at greater intervals, but this imposes considerably greater demands on the oil filter and in particular on its ability to hold debris without at the same time developing an unacceptably high back pressure or restriction to fluid flow. One way of addressing this problem is to use a centrifugal cleaner of the kind in which oil under pressure is admitted to a rotor from which it escapes through nozzles which cause the rotor to spin about its axis. The centrifuge thus formed serves to remove particulate matter very efficiently, it only being necessary to clean out or even replace the rotor after very high mileages, in the case of a vehicle, or after a very extended running period, in the case of a stationary engine.

However, as a practical matter, it is not desirable to run a centrifugal cleaner of this self-powered kind in a full flow environment. It is usual to pass about 10 percent of the total flow through the centrifugal cleaner and the rest of the flow through a filter, either of the conventional paper element kind or through at least a relatively simple wire strainer which can be dismantled for periodic cleaning.

BRIEF DESCRIPTION OF THE INVENTION

The present invention is concerned with a full flow filter of this latter kind. It is an object of the present invention to provide a reusable filter cartridge of the spin-on type which is relatively easy to clean or to replace and with a minimum of components, including oil seals.

In the preferred embodiment, the reusable filter cartridge has a single external oil seal for isolation of both clean and dirty oil from the environment.

According to the present invention, a fluid filter cartridge comprises a generally tubular casing closed at one end and having at the opposite, open end thereof, an annular member defining a filter element receiving aperture and provided with a single external seal extending circumferentially of the casing and projecting generally axially away from the casing, a filter element including a base ring provided with means whereby it can be attached to a supply of fluid to be filtered together with at least one port whereby filtered fluid can flow from the cartridge, a generally tubular filter extending from said base to an end closure therefor, together with connection means internally of said casing and externally of said filter element whereby the latter is removably retained in the casing after rotation of the base ring about its axis relative to the axis of the casing. Said connection means is preferably a bayonet connection.

It will be appreciated that a bayonet connection between the filter element and the casing may be implemented in a number of ways. However, in the interest of simplicity, it is convenient to provide bayonet connection means at or adjacent one end of the casing, with the open end being particularly preferred. According to a particularly preferred aspect of the invention, a fluid filter cartridge comprises a generally tubular casing closed at one end and having at the opposite, open end thereof, an annular member defining a filter element receiving aperture and provided with a single external seal extending circumferentially of the casing and projecting generally axially away from the casing, said annular member including at least two inwardly directed projections equally spaced about the circumference of the casing and projecting into said aperture, a filter element including a base ring provided with means whereby it can be attached to a supply of fluid to be filtered together with at least one port whereby filtered fluid can flow from the cartridge, a generally tubular filter which is preferably affixed to and extending from said base ring to an end closure therefor, said base ring being provided with slots through which said projections may freely pass together with recesses into which said projections are received after passage through said slots and after rotation of the filter element about its axis relative to the axis of the casing, whereby the filter element is removably retained in said casing.

Advantageously, spring means are provided to promote engagement of the bayonet connection after installation of the filter element. Conveniently the spring means take the form of a resilient member such as a spring interposed between the end closure of the filter element and the end closure for the casing. The spring may be attached to the end closure of the filter element or it may be attached to the end of the casing so as to project towards and engage the free end of the filter element.

Preferably there are three equally spaced inwardly directed projections and three corresponding recesses to receive them.

The filter element preferably incorporates a cleanable filter which is a screen of wire mesh, although other materials may be useable including conventional filter media of the disposable kind.

A particularly important aspect of the invention is its relative simplicity, because it has minimal parts and only one external seal which is located radially outwardly from the fluid inlet and outlet ports and the coupling between the annular member and the base ring of the filter element. According to a further aspect of the invention, the filter cartridge of the present invention is used in conjunction with a centrifugal cleaner, either with both mounted to a common supporting structure or if circumstances require it, installed separately. In this case, it is preferred that only about 10 percent of the fluid flow shall pass through the centrifugal cleaner and the remainder through the fluid filter of the present invention. Such an arrangement is especially useful for internal combustion engine applications.

BRIEF DESCRIPTION OF THE DRAWINGS

In order that the invention be better understood, a preferred embodiment of it will now be described by way of example with reference to the accompanying drawings in which.

Like parts in all Figures bear like reference numerals, for ease of identification.

DESCRIPTION OF A PREFERRED EMBODIMENT

Figure 1:
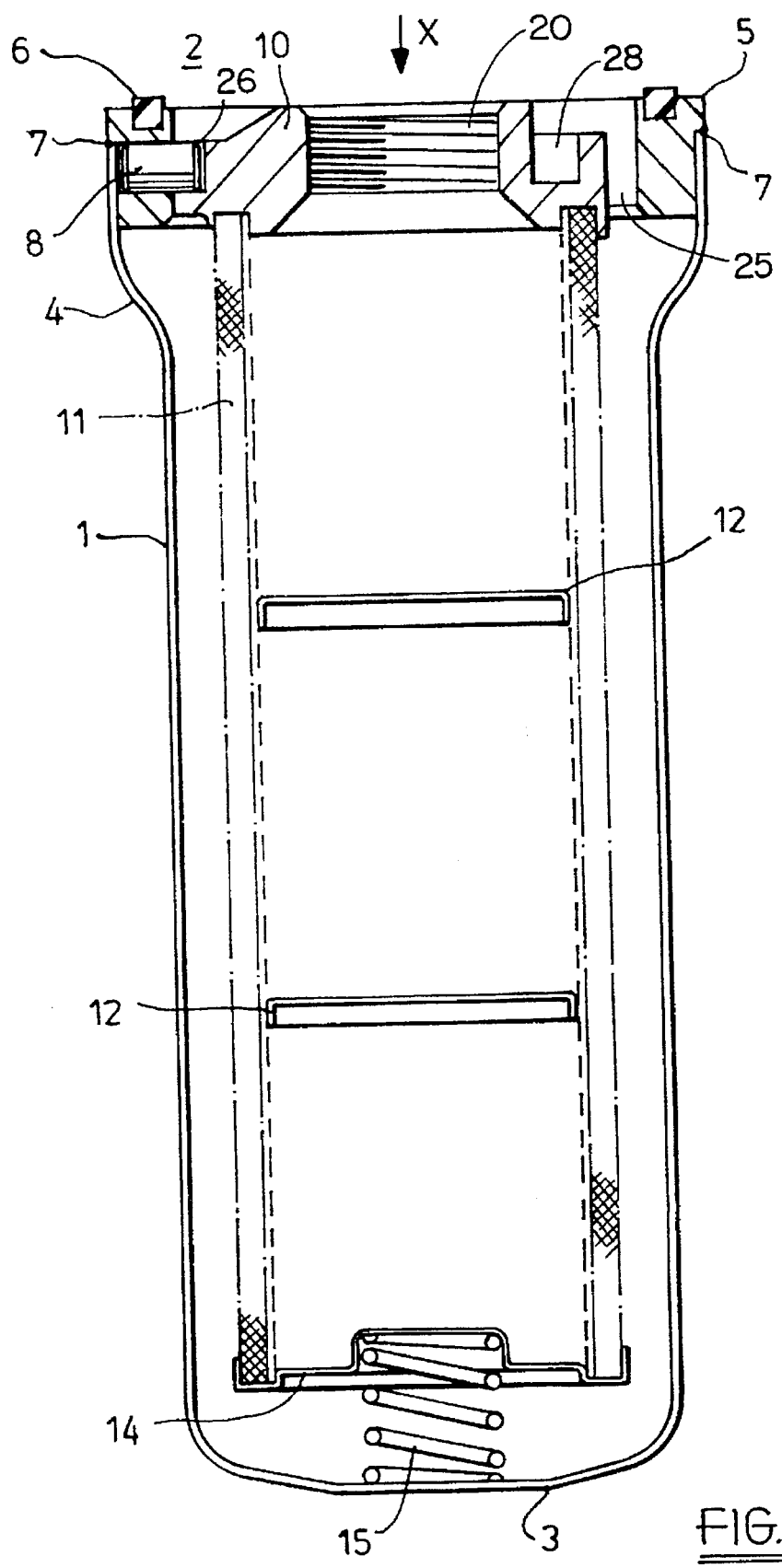
FIG. 1 is a cross-sectional side view of a reusable filter cartridge with a demountable filter element in accordance with this invention.

Referring firstly to FIG. 1, a generally tubular casing 1 is open at one end, 2, and closed at the opposite end 3. The open end may be flared at 4 to provide a smaller and more economical casing, and the enlarged diameter portion receives an annular ring 5, which is best seen in plan view of FIG. 2. An annular axially directed recess in the outwardly facing surface of the ring 5 holds an oil seal 6 which projects axially of the surface of the ring, away from the casing. The oil seal prevents leakage of oil to atmosphere. The ring 5 is welded to the casing at 7 and has three equally spaced inwardly projecting pins 8, one only of which is seen in FIG. 1. The pins are secured by adhesive or are press fit into apertures or may be cast as integral parts of ring 5. Inside the casing there is provided a cleanable filter element comprising a base ring 10 which is a push fit into the ring 5 and which carries the filter medium which preferably comprises tubular wire mesh filter screen 11. The filter screen includes a pair of stiffening/support rings 12 and has at its opposite end a closure plate 14 to which is bonded spring 15. The closure plate itself is bonded to the otherwise open end of the filter screen. Alternately, the filter screen 11 may be constituted by a tubular element of paper, foamed plastics, or any other permeable filter medium of the kind commonly used in the art. It may be integral with, or demountable from the base ring.

Figure 2:
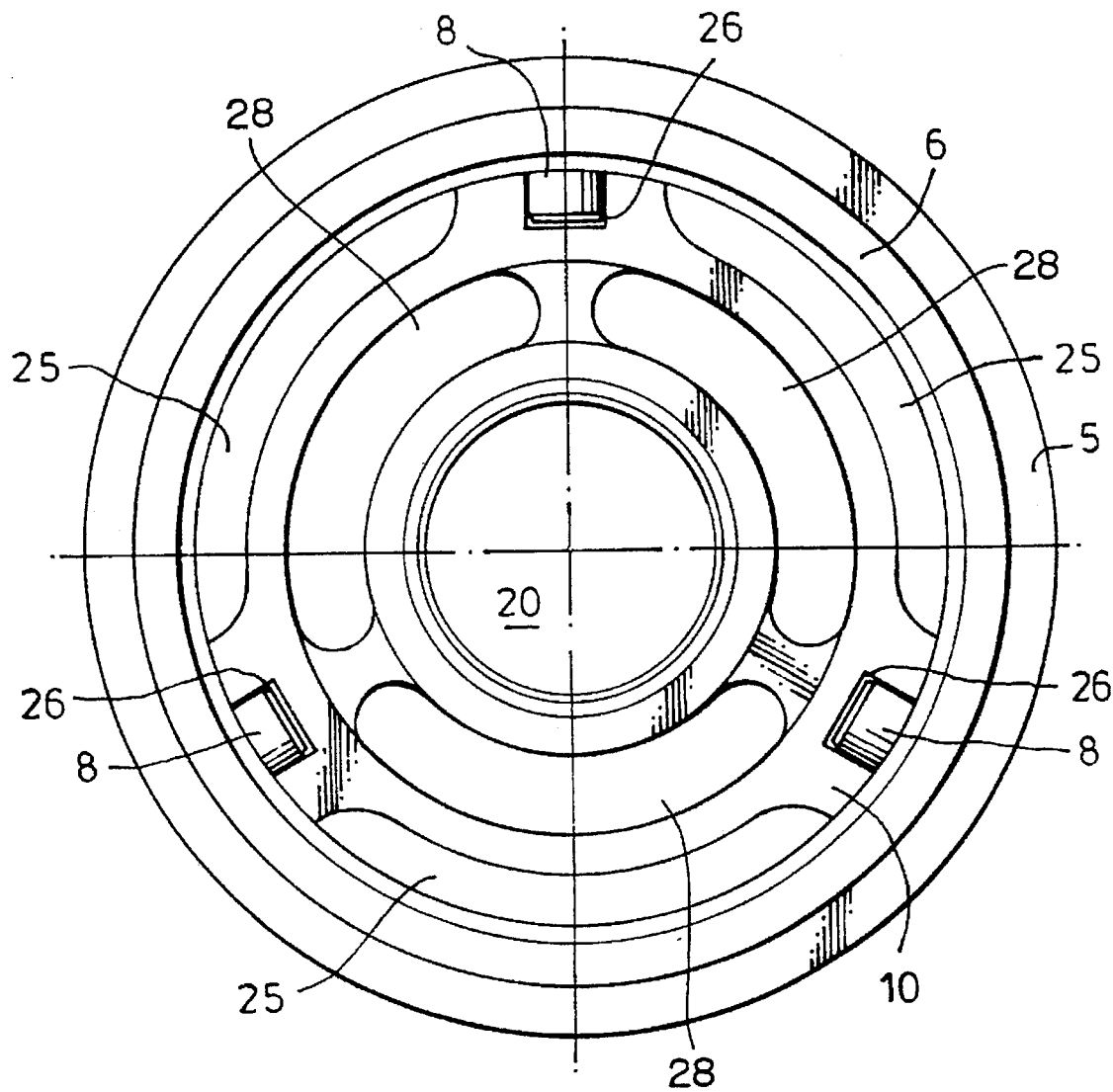
FIG. 2 is an end view of parts of the filter cartridge of FIG. 1, taken in the direction of arrow "X" of the latter.

Referring now to FIG. 2 in particular, the base ring 10 is provided with a central boss which defines the margin of an internally screw threaded aperture 20. This aperture serves both as an oil outlet and as a means of mounting the filter cartridge to associated equipment by the conventional spin-on route, the filter cartridge being screwed down onto a mating boss (not shown) until the seal 6 seats firmly on to the hardware to prevent leakage. Base ring 10 is also provided with three slots 25 through which the pins 8 can freely enter during assembly, the slots 25 further serving as oil ways. Intermediate the slots 25 there are blind slots or recesses 26 which although shown in detail in FIG. 2, are not open to the inside of the casing in the direction of the closed end thereof. As a result, the filter cartridge can only be installed by relative rotation of the filter element and the casing until the pins 8 are lined up with the slots 25, pressing the base ring 10 into the casing against the spring 15, and then rotating the base ring and casing relative to one another until the pins and recesses 26 are aligned. The pins can then enter the latter to seat against the underlying portion of base ring 10 and assembly is thus completed. Removal of the base ring and filter medium for inspection and/or cleaning is the opposite of assembly and is equally straightforward. Additional base ring recesses 28 may be provided, for weight reduction purposes, as desired.

Use of the assembled filter cartridge is conventional. The screw-threaded aperture 20 provides means whereby the filter cartridge may be mounted on or adjacent an engine, for example by screwing it down onto a projecting oilway which is correspondingly externally threaded, until the oil seal 6 seats against associated hardware to form a seal. The threads of apertures 20 act as an internal seal to isolate dirty oil from clean oil, although as an added precaution, one or more sealing rings may be provided within the aperture. The only seal in FIGS. 1 and 2 is seal 6 which isolates oil from the atmosphere. It can be seen in FIG. 1 that seal 6 is located radially outwardly of all potential leakage paths.

The invention can provide for flow in either direction, but without the complexity of prior art devices. It will be appreciated that the embodiment of FIG. 1 incorporates the provision of a single external seal in a reusable spin-on filter cartridge incorporating a demountable, cleanable and reusable filter element and that many other variants are possible without departing from the invention.

It will be appreciated that the demountable filter element of the reusable filter cartridge just described is readily cleanable in that the filter is of wire mesh. However, the same construction can be equally useful for disposable filter media such as paper and the like, as mentioned earlier. Also, as mentioned earlier, the actual filter element may be demountable from the base ring 10. It will also be appreciated that the direction of flow of the oil is not critical; the same construction principles can be used for both inside-to-out, and outside-to-in oil flows. In some circumstances, periodic cleaning of the filter screen may be accomplished by reverse flow techniques, using a detergent-containing medium.

Where appropriate, a pressure relief valve may be incorporated into the assembly so that on clogging of the filter element for any reason, the flow can bypass the filter element. Similarly, a non-return valve may be included to keep the filter cartridge full during shut downs so that there is no delay of engine lubrication on start up and further to prevent reverse flow in normal use, thereby preventing detritus from being flushed back into an associated engine. Such relief and one-way valve systems are of course well-known in the art.

We claim:

1. A spin on-spin off fluid filter cartridge comprising:
    a generally tubular elongated casing, said casing having a long axis and being closed at one end and having an opposite, open end;
    an annular member fixedly secured to said casing at said open end, said annular member defining a filter element receiving aperture, said annular member having an axially outwardly facing annular groove, an elastomeric seal in said annular groove for prevention of leakage of fluid to the environment, said seal extending circumferentially of the casing and projecting axially outwardly from the open end of the casing;
    a filter element including a base ring, said base ring and said filter element being relatively dimensioned to fit through said filter element receiving aperture, said base ring having a centrally located fluid passageway and circumferentially spaced slots disposed in facing relationship said annular member, said slots and said annular member defining a plurality of passageways for passage of fluid to be filtered, said passageways being isolated from the environment by said seal;

said filter element further comprising a generally tubular filter extending within said casing from said base ring in surrounding relationship to said centrally located passageway and being spaced inwardly from the casing and said seal; and filter element connection means internally of the casing comprising interengagable connecting elements on said annular member and said base ring for removably connecting the filter element to the casing, said interengagable connecting elements including axially facing recesses and projections interfitting within said recesses upon insertion of said filter element into said casing and upon rotation relative thereto, said connection means including filter element biasing means for yieldably urging said projections toward said recesses.

2. The fluid filter cartridge of claim 1, wherein the tubular filter screen is constituted by a cleanable wire mesh.

3. The fluid filter cartridge of claim 1, wherein the fluid is oil.

4. A fluid filter cartridge comprising:

a generally tubular casing having a closed end and an open end disposed axially from said closed end, said cartridge including an annular surface disposed on the casing at the open end, said annular surface having an axially outwardly facing annular groove, said annular surface defining a filter element receiving aperture, an annular elastomeric seal in said groove, said seal extending circumferentially of the open end of the casing and projecting axially outwardly from said annular surface, thereby sealing the sole leak path between the filter cartridge and the environment, said casing further including at least two inwardly directed projections equally spaced about the circumference of the casing and projecting radially inwardly into said aperture;

a filter element including a base ring, an elongated generally tubular screen affixed to said base ring and extending axially inwardly therefrom, said base ring and said tubular screen being relatively dimensioned to fit within said filter receiving aperature and being axially relatively movable to an interfitting position in which the base ring is recessed relatively to said seal;

said base ring having a fluid outlet passage in communication with said tubular screen, said passage including a generally centrally located outlet opening facing axially outwardly of the tubular casing and an inlet opening surrounded by said tubular screen, said base ring further having a plurality of circumferentially disposed radial slots cooperating with said annular surface to provide oil passageways to said tubular screen, said radial slots being dimensioned to allow for clearance for passage of said projections upon inward axial movement of said filter element to said interfitting position, said base ring further having axially outwardly facing spaced recesses between said radial slots, said projections being dimensioned to interfit within said recesses upon relative rotation of the filter cartridge and the casing following axial movement to said inserted position.

5. The fluid filter cartridge of claim 4 provided with spring means adapted to urge the projections and recesses to engage.

6. The fluid filter cartridge of claim 5, wherein said spring means is constituted by a resilient member interposed between an end closure of the filter element and the closed end for the casing.

7. The fluid filter cartridge of claim 6, wherein said resilient member comprises a spring.

8. The fluid filter cartridge of claim 7, wherein said spring is attached to an end closure of the filter element so as to project therefrom.

* * * * *